(12) United States Patent
Zhai

(10) Patent No.: US 10,249,301 B2
(45) Date of Patent: *Apr. 2, 2019

(54) METHOD AND SYSTEM FOR SPEECH RECOGNITION PROCESSING

(71) Applicant: Alibaba Group Holding Limited, George Town (KY)

(72) Inventor: Lufeng Zhai, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,386

(22) Filed: Apr. 27, 2018

(65) Prior Publication Data

US 2018/0247652 A1 Aug. 30, 2018

Related U.S. Application Data

(63) Continuation of application No. 14/562,410, filed on Dec. 5, 2014, now Pat. No. 10,140,989.

(30) Foreign Application Priority Data

Dec. 10, 2013 (CN) .......................... 2013 1 0665238

(51) Int. Cl.
| | | |
|---|---|---|
| *G10L 15/00* | (2013.01) | |
| *G10L 15/26* | (2006.01) | |
| *H04L 12/58* | (2006.01) | |
| *G10L 15/22* | (2006.01) | |

(52) U.S. Cl.
CPC ............ *G10L 15/26* (2013.01); *G10L 15/265* (2013.01); *H04L 51/046* (2013.01); *H04L 51/066* (2013.01); *G10L 15/22* (2013.01)

(58) Field of Classification Search
CPC combination set(s) only.
See application file for complete search history.

(56) References Cited

U.S. PATENT DOCUMENTS

| | | | |
|---|---|---|---|
| 7,515,903 | B1 | 4/2009 | Cast |
| 7,739,118 | B2 | 6/2010 | Ueno |
| 8,645,138 | B1 | 2/2014 | Weinstein |

(Continued)

FOREIGN PATENT DOCUMENTS

| | | |
|---|---|---|
| CN | 101079836 | 11/2007 |
| CN | 101938391 | 1/2011 |

(Continued)

*Primary Examiner* — Vu B Hang
(74) *Attorney, Agent, or Firm* — Van Pelt, Yi & James LLP

(57) ABSTRACT

Embodiments of the present application relate to a method for speech recognition processing, a system for speech recognition processing, and a computer program product for speech recognition processing. A method for speech recognition processing is provided. The method includes receiving a speech recognition request, the speech recognition request including a pre-assigned speech ID that uniquely identifies speech information and a speech recognition command to convert speech into text, locating speech information based on the speech ID, automatically converting the speech information to obtain text information corresponding to the speech information in response to the speech recognition command, and sending the obtained text information as a speech recognition result to a user that caused the speech recognition request to be issued.

14 Claims, 10 Drawing Sheets

(56) References Cited

U.S. PATENT DOCUMENTS

| | | |
|---|---|---|
| 8,983,835 B2 | 3/2015 | Wong |
| 9,263,029 B2 | 2/2016 | Lu |
| 9,756,439 B2 | 9/2017 | Gao |
| 2005/0111631 A1 | 5/2005 | Jordan |
| 2007/0192094 A1 | 8/2007 | Garudadri |
| 2009/0157392 A1* | 6/2009 | Alewine ............... G10L 15/183 704/201 |
| 2012/0131471 A1* | 5/2012 | Terlouw .............. G06F 3/04883 715/741 |
| 2012/0197629 A1 | 8/2012 | Nakamura |
| 2013/0067006 A1 | 3/2013 | Luan |
| 2014/0012585 A1* | 1/2014 | Heo .................... H04N 21/233 704/270.1 |

FOREIGN PATENT DOCUMENTS

| | | |
|---|---|---|
| CN | 102299934 | 12/2011 |
| CN | 102347913 | 2/2012 |
| CN | 102710539 | 10/2012 |
| CN | 103248760 | 8/2013 |
| CN | 103281683 | 9/2013 |
| CN | 103327181 | 9/2013 |

\* cited by examiner

METHOD AND SYSTEM FOR SPEECH RECOGNITION PROCESSING

CROSS REFERENCE TO OTHER APPLICATIONS

This application is a continuation of co-pending U.S. patent application Ser. No. 14/562,410, entitled METHOD AND SYSTEM FOR SPEECH RECOGNITION PROCESSING, filed Dec. 5, 2014 which claims priority to People's Republic of China Patent Application No. 201310665238.1 entitled A SPEECH RECOGNITION METHOD AND SYSTEM, filed Dec. 10, 2013 both of which are incorporated herein by reference for all purposes.

FIELD OF THE INVENTION

The present application relates to a method and system for speech recognition processing.

BACKGROUND OF THE INVENTION

As communication technologies develop and smart phones become more common, various Internet communication tools, such as Microsoft Network (MSN), Tencent QQ, WeChat, Laiwang, and other communication products, are used by the general public to communicate with each other. In addition, among these communication tools, voice messages are popular because the voice messages are easy to transmit, and allow for quick and convenient communication. Typically, phones, personal computers (PCs), tablets/pads, personal digital assistants (PDAs), mobile internet devices (MIDs), and other such mobile terminals or network terminals (Internet equipment) provide speech input and output functions via network communication applications (apps).

Conventionally, inputting and outputting voice messages with network communication tools, such as instant messaging tools, include the following: a sending end records a voice message to be issued by a sender-user, and after encoding the recorded voice message, sends the encoded voice message to an instant messaging server (IM-Server, IMS). The IMS pushes the sent encoded voice message to a corresponding receiving end. Then, when the receiver-user is to listen to the voice message, the receiving end decodes and plays the received voice message. The voice message function of existing instant chat tools can only be played for the users, but when no earphones are connected to play the voice message, there can be various problems such as: 1) Privacy cannot be guaranteed. For example, playing a voice message involving a private matter in a public place may not be suitable. 2) People nearby are affected. For example, playing a voice message in a meeting room or a reading room is not courteous, yet an immediate desire to know the contents of the message that is being conveyed by speech exists. 3) Clarity of the voice message is affected in noisy environments. For example, excessive noise makes clearly understanding the voice message conveyed by the speech difficult.

BRIEF DESCRIPTION OF THE DRAWINGS

Various embodiments of the invention are disclosed in the following detailed description and the accompanying drawings.

DETAILED DESCRIPTION

Figure 1A:
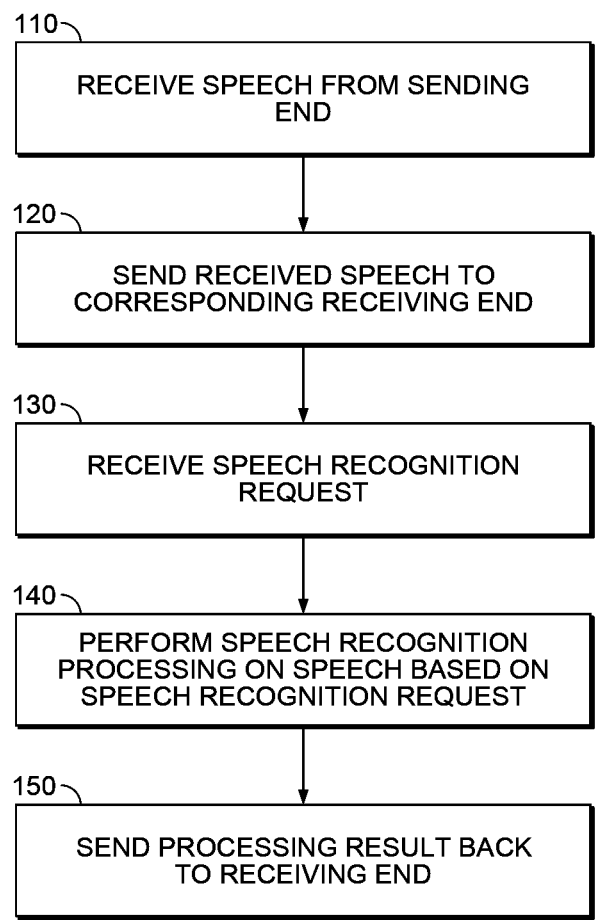
FIG. 1A is a flowchart illustrating an embodiment of a process for speech recognition.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application discloses that a server looks up a corresponding speech on a communication server based on a speech ID in a speech recognition request sent by a receiving end and provides the corresponding speech to a speech recognition module. The speech recognition module conducts speech recognition on the speech, converts the speech into text, and sends the text results back to the receiving end. The receiving end displays the text corresponding to the speech for a user to browse. Therefore, the present application can satisfy browsing the speech with one's eyes based on speech recognition and text conversation benefiting from storage and high-efficiency processing of the server. To save time, the server quickly acquires the speech sent by a sending end and without requiring the user of the receiving end to upload the speech when the recognition of the speech is needed. The server accelerates the rate of speech recognition processing, increases speech recognition processing efficiency, and conserves network resources.

In the present application, network communication tools, such as instant chat tools, include client applications (also referred to as apps) installed on one or more pieces of terminal equipment used by one or more users to perform instant messaging. With an app, a user can connect and access a server. The app can receive text, speech, requests, etc. from certain clients and/or forward such text, speech, requests, etc. to other clients through the server. Instant messaging, data processing, or a combination thereof can be achieved by the one or more users.

Terminal equipment on which instant messaging tool client apps have been installed is referred to below as the client.

In some embodiments, the terminal equipment includes various mobile terminals, network terminals, and other equipment, such as mobile phones, personal computers (PCs), iPods, tablets, personal digital assistants (PDAs), mobile Internet devices (MIDs), wearable devices, etc.

In some embodiments, a user that uses terminal equipment executes an instant messaging tool client app on the terminal equipment to send and/or receive speech and text, via an instant messaging service being implemented by a server. In some embodiments, the speech includes voice messages and speech information, and the text includes text messages and text information.

As an example, speech issued by a sender-user is recorded, encoded, and sent to a server by terminal equipment that the sender-user is using. For example, the speech is sent to an instant messaging server (IMS) and is stored by the server (the instant messaging server, IMS) and pushed to terminal equipment used by a receiver-user. For example, sender-clients that send information are to be referred to as sending ends, and receiver-clients that receive information are to be referred to as receiving ends. Receiving and sending are inter-connected. In other words, receiving and sending are complementary.

The following description uses an example of an instant chat tool. FIG. 1A is a flowchart illustrating an embodiment of a process for speech recognition. In some embodiments, the process 100 is implemented by a server 530 of FIG. 5C and comprises:

In some embodiments, a sending end acquires a speech and sends the speech to a server. For example, in some embodiments, a client device includes a microphone, and an application installed on the client device implements the functions of activating the microphone and using the microphone to capture a speech.

In some embodiments, the sending end (a sending terminal) sends speech to a receiving end (a receiving terminal) where the speech is first received and pushed by the server to the receiving end. In some embodiments, the sending end records the speech that is to be sent, encodes the speech as an audio recording, and sends the audio recording to the server.

For example, an instant chat tool connects clients A and B to a server through a (wireless, mobile, cable, etc.) network to implement receiving and sending of speech in an instant chat process between clients A and B. If a user of chat client A sends a speech to a user of chat client B, then the client A is to record the speech that the user intends to transmit to client B. For example, the terminal equipment of client A receives the speech using a microphone or other speech-receiving device. The terminal equipment of client A converts analogue signals of the speech into digital signals and stores the converted digital signals in a binary digital form. Binary digital forms include, for example, WAV files, MP3s, etc. Speech that is in digital form can be encoded and compressed. For example, the speech that is in digital form can undergo ARM, OPUS, or Speex compression encoding. In addition, the encoded speech can be decoded and played on client B.

In 110, the server receives the speech from a sending end. In some embodiments, the sending end sends the speech to the network via a communication interface, and the message is routed to the server using standard routing techniques.

In 120, the server sends the received speech to a corresponding receiving end.

First, the speech (i.e., the encoded audio recording) is sent to the server side. The server side receives and stores the speech. Moreover, for each received speech, the server assigns a unique identifier (ID) to the message, which can be called a speech ID or a voice message ID (voice message information). In some embodiments, the speech ID or the voice message ID is created based on a date-time-sequential number. In some embodiments, the speech ID or the voice message ID is a randomly generated number.

For example, client A sends the encoded speech recording to a server, such as an instant messaging server (IMS). The IMS can receive and store the encoded speech recording (binary speech data, e.g., "00011011"). In parallel or at the same time, the IMS can assign a unique identifier (ID) to the speech to differentiate the speech from other speeches. For example, the IMS assigns the ID "100" to the speech having the digital form "00011011" and records and stores the speech in a concatenated binary character string, e.g., "10000011011." In some embodiments, the binary speech data is stored in a database and the unique ID is used as an index for looking up the corresponding binary speech data in the database.

Subsequently, the server sends the received speech recording to the receiving end. The receiving end obtains the speech corresponding to the recording, and also obtains the speech ID of the speech.

For example, the instant messaging server (IMS) pushes the speech recording received from client A to client B, i.e., to the target for which the speech issued by client A is intended. For example, clients A and B are both mobile phone clients, and the user of client A wishes to send a message or information to mobile phone client B. First, after receiving the message or information from client A, the IMS pushes the received message or information to the mobile phone client B. In some embodiments, the IMS identifies that client A is sending a message to client B based on a destination mobile phone number included in the message. For example, the destination mobile phone number included in the message relates to client B.

The receiving end receives the speech recording pushed by the server.

When the receiving end receives the speech recording pushed by the server, the receiving end can generate a mark indicating the speech recording and display the mark to the user of the receiving end. The mark can display information relating to the speech recording, such as length of the speech recording, information about the sending end of the speech recording, position information on where the speech is, or any combination thereof. For example, the mark includes the length of the speech recording. The mark can be an icon, a symbol, a picture, an image, etc.

For example, client B receives a recording pushed from the IMS, the recording being a speech that client A has sent to client B. After client B receives the recording, a mark or any other appropriate visual indicator is displayed on a display screen of terminal equipment of client B.

Figure 2:
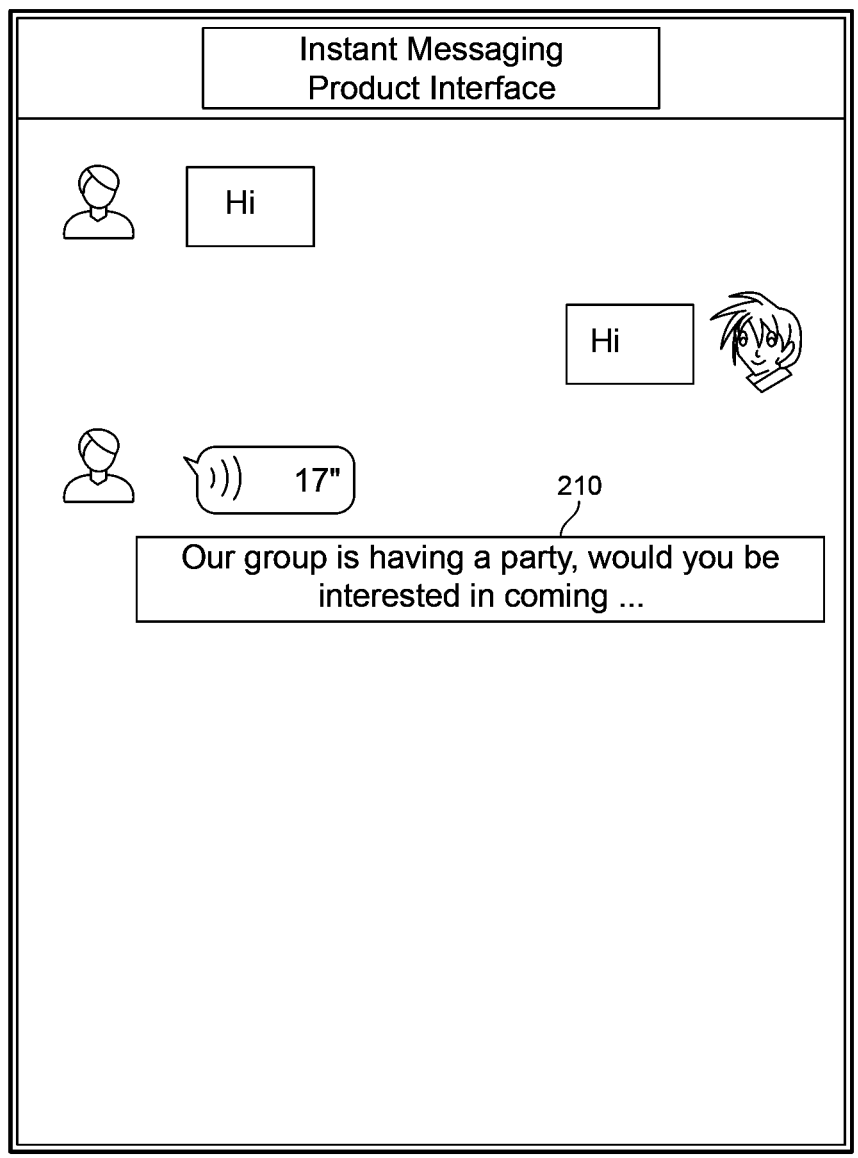
FIG. 2 is a diagram illustrating an embodiment of a receiving end displaying speech marks and text information.

FIG. 2 is a diagram illustrating an embodiment of a receiving end displaying speech marks and text information. Mark 210 indicates that client B has received the speech recording sent by client A. The position of the mark indicates the position of the received speech recording on the display screen in a series of messages being exchanged between the clients. Upon viewing the mark, the user of client B can thus be alerted that client A has sent the user a speech. The mark 210 indicates that the message is at a certain position on the screen, and the message content can be obtained at that position.

The receiving end issues a speech recognition request for the speech recording and sends the speech recognition request to the server side.

In some embodiments, the mark corresponding to the speech or an area near the mark 210 has one or more user-operable command buttons, controls, plug-ins, etc., bound to the mark or embedded in the mark, which serves as a graphical user interface (GUI) for interacting with the user and acquiring user commands (instructions). The user thus can perform an action on the mark by, e.g., selecting, clicking, or pressing the mark or the area near the mark, and trigger a bound operating command, e.g., issue a command to instruct the receiving end client to process the speech.

For example, if the user of client B is to directly receive and listen to the speech recording, the user can click mark 210 representing the speech recording. The client B then plays the corresponding speech. If the user is to subject the speech recording to further processing, the user can press the mark for a period of time (e.g., press or click the mark for longer than a preset time threshold value) and a choice box pops up. The choice box can provide one or more commands in the form of a menu, a dropdown box, a set of selection boxes, or any other appropriate form for the user to choose from. The one or more commands include Convert to Text, Add as Favorite, Delete, Listen, etc. As an example, when the user selects a "Convert to Text" option in the choice box, the client B obtains the "Convert speech to text" command, i.e., the speech recognition command issued by the user.

In one example, the action of the user relating to the mark indicating speech generates or issues a user command, e.g., a speech recognition/text conversion command. The receiving end generates the user's speech recognition request for the speech recording and sends the speech recognition request to the server to request speech recognition processing and to obtain text corresponding to the speech. In this example, the speech recognition request includes the speech ID and the speech recognition command.

In some embodiments, the sending of the request to the server includes: sending the request to an instant messaging server (IMS) at the server side, or sending the request to a speech recognition server (or speech recognition server cluster) at the server side.

Referring back to FIG. 1A, in 130, the server side receives the speech recognition request.

In 140, the server side performs speech recognition processing on the speech based on the speech recognition request.

In 150, the server sends the processing result back to the receiving end.

In some embodiments, the server receives the speech processing request from the receiving end. The server extracts the speech ID from the speech processing request. The server locates the speech corresponding to the speech ID in a server-side database and processes the located speech.

The processing of the speech corresponds to speech recognition processing, which is used to convert the speech into a text message. Based on the speech recognition command in the speech recognition request, the speech undergoes speech recognition processing to convert the speech into text and sends the text back to the receiving end, which outputs the text to the user.

In some embodiments, a speech recognition module is added to the server to perform speech recognition processing and obtain the converted text corresponding to the speech. In one approach, a speech recognition module is added to the server itself. In another approach, a separate speech recognition server (or speech recognition server cluster) is connected to the server.

In one implementation, the server side includes an instant messaging server (IMS), and a speech recognition module is added to the IMS. When the receiving end sends a speech recognition request, the speech recognition request is received by the IMS, which extracts the speech ID from the request and locates the speech corresponding to the ID in a speech database stored at the server side. The IMS delivers the located speech corresponding to the ID and a speech recognition command in the request to the speech recognition module in the IMS. The speech recognition module performs the speech recognition processing to complete speech-to-text conversion and obtains the text corresponding to the speech. The IMS sends the obtained text as the conversion result (text result) back to the receiving end, which outputs the obtained text to the user.

In another implementation, the server side includes an IMS and a speech recognition server or speech recognition server cluster connected to the IMS.

Figure 3A:
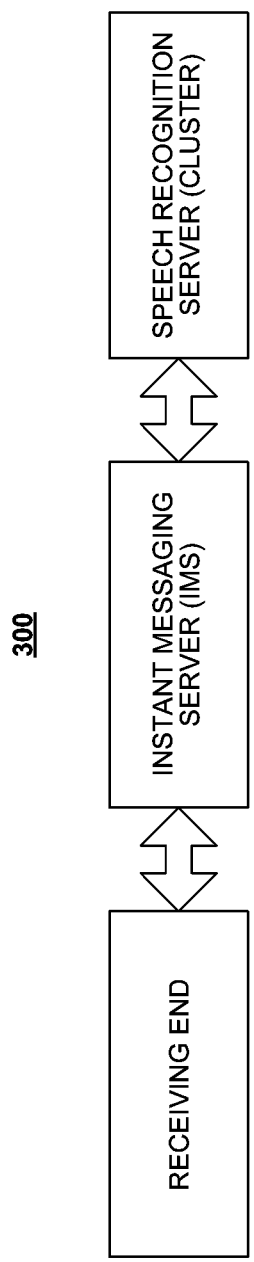
FIGS. 3A and 3B are structural diagrams of embodiments of systems for speech recognition processing.
Figure 3B:
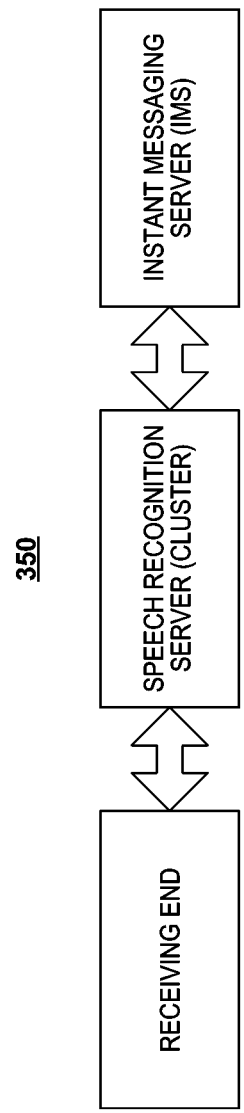

FIGS. 3A and 3B are structural diagrams of embodiments of systems for speech recognition processing. In some embodiments, systems 300 of FIG. 3A and 350 of FIG. 3B implement the process 100 of FIG. 1A.

In the implementation shown in FIG. 3A, when the receiving end sends a speech recognition request, the speech recognition request is received by the IMS, which extracts the speech ID from the request and locates the speech corresponding to the speech ID from a speech database.

The IMS delivers the located speech corresponding to the speech ID and the speech recognition command in the request to the speech recognition server (or server cluster) connected to the IMS. The speech recognition server (or server cluster) performs a speech-to-text conversion and obtains the text corresponding to the speech.

The speech recognition server (or server cluster) sends the obtained text back to the IMS. The IMS returns the text as a conversion result to the receiving end, which outputs the text to the user.

In some embodiments, the process of converting and sending back the result employs a synchronous mode, comprising: the IMS remains on standby during processing by the speech recognition server (or server cluster). After the IMS obtains the result sent back by the speech recognition server (or server cluster), the IMS sends the result back to the receiving end.

In some embodiments, the process of converting and sending back the result employs an asynchronous mode, comprising: after the IMS pushes the speech to a speech recognition server (or server cluster), the IMS does not remain on standby, but is awoken only after the speech recognition server (or server cluster) generates a recognition result. The IMS obtains the result that is sent back and then sends the result back to the receiving end. Because speech recognition processing involves large amounts of computation, the speech recognition processing takes a certain length of time. Therefore, the asynchronous mode further reduces the high concurrent load that would result from having the IMS wait continuously.

In the implementation shown in FIG. 3B, when the receiving end sends a speech recognition request to the speech recognition server (or server cluster), the speech recognition request is received by the speech recognition server (or server cluster). The speech recognition server (or server cluster) extracts the speech ID from the request and sends the speech ID to the connected IMS.

Based on the speech ID sent from the speech recognition server, the IMS locates the speech to which the speech ID was assigned among speeches that have been previously stored, and the IMS pushes the located result, i.e., the speech corresponding to the ID, to the speech recognition server (or server cluster). The speech recognition server (or server cluster) performs the speech-to-text processing based on the speech recognition command in the request and obtains the text corresponding to the speech.

The speech recognition server (or server cluster) returns the obtained text as the conversion result directly to the receiving end, which outputs the obtained text to the user.

Because the computation performance requirements are relatively high for speech recognition, more CPUs (multi-core CPUs) and a large amount of memory are required. Therefore, a server or a high-concurrency server cluster approach (as shown in FIGS. 3A and 3B) is implemented. These approaches can effectively increase the computational efficiency of the speech recognition algorithms. Examples of speech recognition algorithms include hidden Markov models (HMM) and deep neural networks (DNN). In addition, in order to further increase algorithm efficiency, C or C++ language can be employed to implement some algorithms with high parallel requirements (deep neural networks). Parallel processing algorithms typically involve multi-threading to balance CPU resources to increase efficiency. A graphics processing unit (GPU) of a simple graphics card can support more than a thousand computations in parallel. Furthermore, GPU processing can also be implemented to perform the speech recognition and conversion algorithms.

Figure 4:
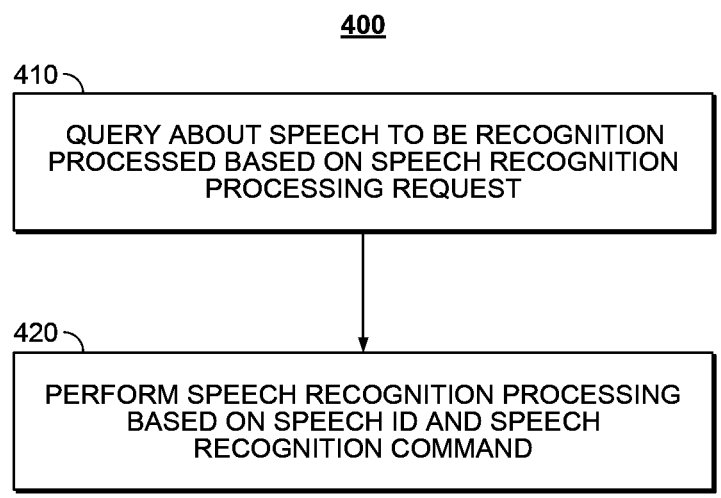
FIG. 4 is a flowchart illustrating an embodiment of a process for converting speech to text.

FIG. 4 is a flowchart illustrating an embodiment of a process for converting speech to text. In some embodiments, the process 400 is an implementation of 140 of FIG. 1A and comprises:

In 410, the server side queries about speech to be recognition processed based on a speech recognition processing request.

The receiving end sends the user-issued speech recognition processing request to convert a received piece of speech into text to the server side, where the user-issued speech recognition processing request is received by, for example, an IMS or speech recognition server.

For example, if the speech recognition server receives the request, the speech recognition server can extract, from the request, the ID of the speech to be processed that was sent together with the speech recognition command and then notify the IMS that is connected to the speech recognition server, based on the ID, to look up the speech corresponding to the ID. The IMS can look up the speech to which this ID has been assigned in an IMS storage database based on the ID as a keyword and push the speech to the speech recognition server (or server cluster). If the IMS receives the request, the IMS can extract from the request the ID of the speech to be processed that was sent together with the speech recognition command, and the IMS can look up the speech to which the ID has been assigned in the IMS storage database and send the speech and the speech recognition command to the speech recognition server (or server cluster).

In 420, the server side performs speech recognition processing based on the speech ID and the speech recognition command in the request. The speech corresponding to the ID is converted to corresponding text, and the text is sent back as a result to the receiving end.

For example, if the speech recognition server (or server cluster) directly receives the request, then the speech recognition server (or server cluster) obtains the IMS-pushed speech corresponding to the ID. Speech recognition processing can be triggered based on the speech recognition command. Accordingly, the speech is thus converted to the corresponding text. Subsequently, the speech recognition server (or server cluster) sends the obtained text speech recognition result back directly to the receiving end.

For example, if the IMS receives the request, then the speech recognition server (or server cluster) obtains the IMS-pushed speech corresponding to the ID and the speech recognition command. The speech recognition processing is triggered based on the speech recognition command. Thus, the speech is converted to the corresponding text, and the result is sent back to the IMS. Subsequently, the IMS returns the result to the receiving end.

Accordingly, the server side automatically acquires and processes the speech. The receiving end only sends a processing command and the speech ID, without having to push speech data to the server side. This process 400 greatly increases transmission and processing speed of speech data and conserves network flows, i.e., conserves network resources. The process 400 increases speech recognition and conversion efficiency and provides increased convenience to users.

The receiving end receives the results and outputs text content corresponding to the speech to the user.

In some embodiments, the receiving end displays and outputs the speech recognition processing result returned by the server, i.e., the text of the corresponding speech, on the terminal equipment screen of the receiving end. The display position can be set according to need. For example, the display position is set by the client on the client terminal. For example, the text is displayed adjacent to or near the position of the speech mark or the text is displayed in the form of a floating, transparent scrollbar or bubble at the mark position or near the mark position, etc.

Furthermore, the text of extra-long speech can also be line-wrapped, or a portion of the text can be truncated, with only the initial text and/or concluding text displayed, etc.

Furthermore, the displaying of the text can cease under a certain condition or after a certain length of time. For example, the displayed text is prevented from being displayed (concealed) after the user has finished viewing the text, if the user leaves the instant messaging app interface, locks the screen, enters a screen saving mode, or fails to perform an operation on the terminal equipment within a predetermined amount of time (e.g., 30 seconds or a minute). The text is not displayed again until the user again views the text, e.g., selects the "Converted text" feature. In some embodiments, for text that has already been converted, a cache can be set up to store already converted text corresponding to the speech.

In one implementation, in the case of a single user of a receiving end making a plurality of requests for speech-to-text conversion of a plurality of users (as in an instant messaging tool group or a group chat for an instant messaging tool) successively requesting speech-to-text conversion for speech having the same ID, a cache mechanism can be established for speech already converted. The text result generated from a first request can be stored based on the speech ID in the IMS, the speech recognition server (or server cluster), another storage server, or any combination thereof. When subsequent requests are issued, the speech ID can be used to query the cache and determine whether the text result already exists. If a corresponding result exists, the result is returned directly. If a corresponding result does not exist, then speech recognition processing proceeds, as in operation 140 of FIG. 1A and operations 410 and 420 of FIG. 4. This implementation helps to increase the response speed of duplicate requests for the same speech-to-text conversion and reduce the computational load and network bandwidth usage. In other words, the implementation increases response efficiency and conserves network resources.

In some embodiments, by sending a speech recognition request, client B automatically acquires the speech text, which is displayed near the speech. The text corresponding to the speech is displayed in a partial truncated form below the speech mark display position on a screen of client B, as shown in FIG. 2. In an example, based on group chat, if a cache has been set up on the server, and the speech ID is stored together with the text result corresponding to the speech, then a plurality of client Bs and a plurality of client B users will exist. The user of a first client B makes a first request and acquires a text result. The result is stored in the cache. Then, when a user of a second client B, who also is to view the text content of the speech, issues a speech recognition request, the text result can be quickly located in the server cache based on the ID, and the result can be returned to the second client B.

Thus, the receiving end can display to its user the text content that is to be conveyed for the speech, and complete the instant messaging process whereby one piece of speech is converted into text form between the sending end and the receiving end.

In another implementation, when the server receives the speech from the sending end and the ID corresponding to the speech, the server performs recognition processing on the speech, obtains text converted from the speech, and stores the text result in correspondence with the speech ID or stores the text result in correspondence with the speech ID and the speech. Thus, each piece of speech to be sent to the receiving end undergoes recognition processing when the speech is received, and the corresponding text result is obtained and stored by the server. An example of the recognition and conversion of the speech is as follows: the IMS provides the speech that comes from the sending end to the speech recognition server (or server cluster) or a speech recognition module to perform text conversion, and the obtained text is sent back to the IMS. The IMS or the speech recognition server (or server cluster) stores the obtained text. The conversion processing is performed by the server side whenever a piece of speech is received and the speech ID assigned, i.e., in operation 140 of FIG. 1A. The corresponding text result is obtained and stored together with the speech ID, etc. Thus, since the conversion was completed, when the server side receives a speech recognition request from the receiving end, the server is to only extract the ID from the request, look up the text result for the already converted speech, which was stored corresponding with the ID, and send back the result to the receiving end as the result for the speech recognition command within the request. The server does not have to look up the speech corresponding to the speech ID based on the speech recognition request and then convert the speech. Accordingly, an immediate response to a speech recognition request or a speech recognition command is possible. This implementation greatly increases the response speed for requests, text is sent back quickly to the receiving end, and response efficiency has been increased.

Figure 1B:
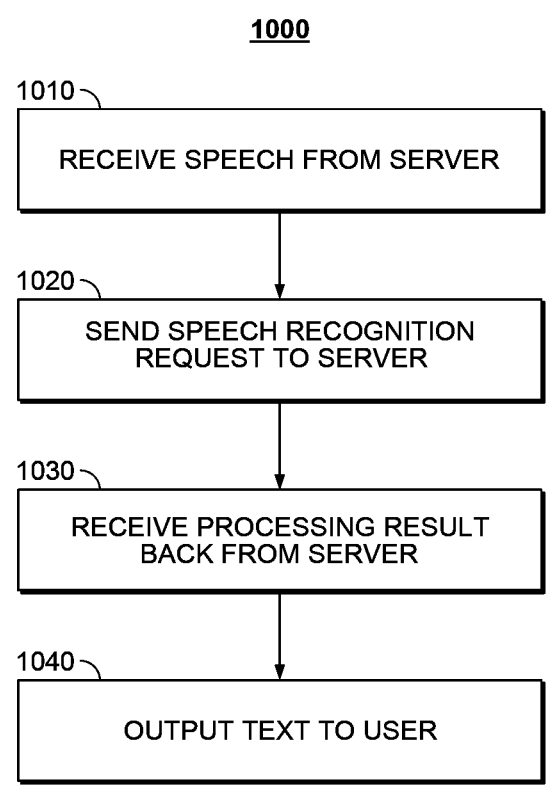
FIG. 1B is a flowchart illustrating another embodiment of a process for speech recognition.

FIG. 1B is a flowchart illustrating an embodiment of a process for speech recognition. In some embodiments, the process 1000 is implemented by a receiving end 520 of FIG. 5C and comprises:

In 1010, the receiving end receives a pushed speech from a server.

In 1020, the receiving end issues a speech recognition request for a speech and sends the speech recognition request to a server. In some embodiments, the speech recognition request includes a speech ID, a speech recognition command, etc.

Upon receiving the speech recognition request, the server side performs speech recognition processing on the speech based on the speech recognition request, and sends the processing result back to the receiving end.

In 1030, the receiving end receives a processing result from the server.

In 1040, the receiving end outputs text content corresponding to the speech to a user.

Figure 5A:
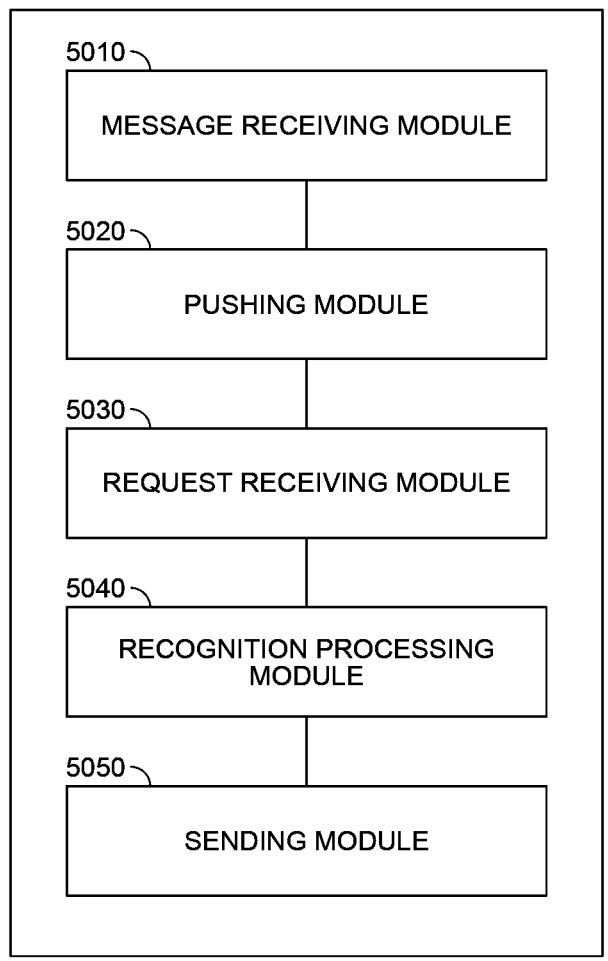
FIG. 5A is a diagram of an embodiment of a device for speech recognition processing.

FIG. 5A is a diagram of an embodiment of a device for speech recognition processing. In some embodiments, the device 5000 implements the process 100 of FIG. 1A and comprises a message receiving module 5010, a pushing module 5020, a request receiving module 5030, a recognition processing module 5040, and a sending module 5050.

In some embodiments, the message receiving module 5010 receives a speech from a sending end.

In some embodiments, the pushing module 5020 sends the received speech to a corresponding receiving end.

In some embodiments, the request receiving module 5030 receives a speech recognition request.

In some embodiments, the recognition processing module 5040 performs speech recognition processing on the speech based on the speech recognition request. In some embodiments, the speech recognition request includes a speech ID, a speech recognition command, etc.

In some embodiments, the sending module 5050 sends the processing result from the recognition processing module 5040 back to the receiving end.

Figure 5B:
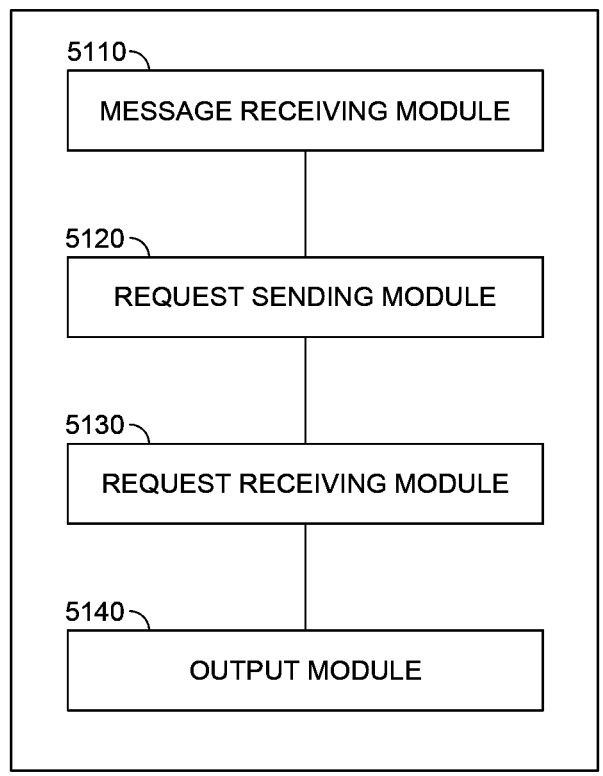
FIG. 5B is a diagram of another embodiment of a device for speech recognition processing.

FIG. 5B is a diagram of another embodiment of a device for speech recognition processing. In some embodiments, the device 5100 implements the process 1000 of FIG. 1B and comprises a message receiving module 5110, a request sending module 5120, a request receiving module 5130, and an output module 5140.

In some embodiments, the message receiving module 5110 receives a pushed speech from a server.

In some embodiments, the request sending module 5120 issues a speech recognition request for a speech and sends the speech recognition request to the server.

In some embodiments, the request receiving module 5130 receives a processing result from the server.

In some embodiments, the output module 5140 outputs text content corresponding to the speech to a user.

Figure 5C:
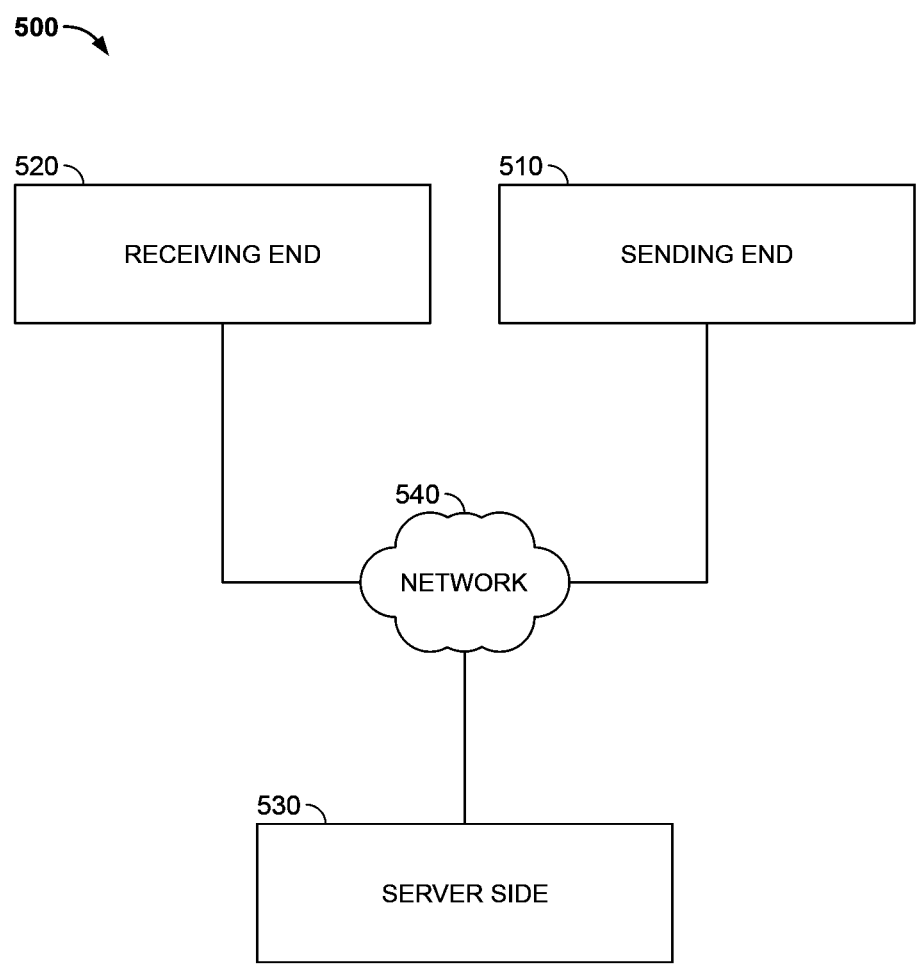
FIG. 5C is a structural diagram of an embodiment of a system for speech recognition processing.

FIG. 5C is a structural diagram of an embodiment of a system for speech recognition processing. In some embodiments, the system 500 includes a sending end 510, a receiving end 520, and a server side 530. In some embodiments, the sending end 510, the receiving end 520, and the server side 530 are connected to each other via a network 540.

The sending end 510 codes the to-be-sent speech recording and transmits the encoded speech recording to the receiving end 520. The recording code (speech) is sent to the server side 530. As an example, the speech encoding processing is implemented by the sending end 510.

The receiving end 520 receives the speech pushed from the server side 530 and sent by the sending end 510 to the receiving end 520. The receiving end 520 displays a mark representing the speech. Then, when a conversion of speech into text is to be performed, a speech recognition request issued by the user's clicking on the mark can be sent to the server side 530 to implement converting of the speech-to-text and to obtain the text result. Furthermore, when the server side 530 sends back a speech-recognized text result to the receiving end 520, the text result is output to the user.

The server side 530 receives a recording sent from the sending end 510 and pushes the conversion results of the recording to the receiving end 520.

In some embodiments, the server side 530 comprises an instant messaging server. The instant messaging server receives a recording from the sending end 510 and pushes the conversion results of the recording to the receiving end 520. Furthermore, the instant messaging server can store a speech corresponding to the recording, assign a unique ID to the speech, and store the speech with the corresponding ID.

Furthermore, in some embodiments, a speech recognition service module is added to the server side 530. In one approach, the speech recognition module is added to the IMS to perform speech recognition processing. In another approach, a speech recognition module or a speech recognition server (or server cluster) is connected to the IMS to perform speech recognition processing.

Thus, the server side 530 receives a speech recognition request from the receiving end 520 and performs speech to text conversion of the speech corresponding to the ID in the speech recognition request.

In one approach, the IMS receives the request, extracts the speech ID from the request, locates the corresponding speech, and delivers the corresponding speech to the speech recognition module or the speech recognition server (or server cluster), which performs the speech-to-text conversion. The converted text result is sent to the IMS to send the text result back to the receiving end 520.

In another approach, the speech recognition server (or server cluster) receives the request, extracts the speech ID from the request, and gives the speech ID to the IMS to locate the corresponding speech and deliver the speech to the speech recognition server (or server cluster). The speech recognition server (or server cluster) obtains the speech from the IMS, performs speech-to-text conversion, and sends the text result back to the receiving end 520.

Furthermore, the IMS or the speech recognition server (or server cluster) can also, in correspondence with the speech ID, speech, or a combination thereof, store the text result or cache the text result, so that when another request for text conversion of the same speech is received, the IMS or the speech recognition server (or server cluster) can directly look up the text result using the speech ID in the request and quickly provide a response to the request.

In addition, when the server side 530 receives a speech recording from the sending end 510, the server side 530 can also perform speech recognition processing on the speech recording (without having to use the ID to look the speech recording up) and assign and store a unique ID corresponding to the speech. Furthermore, the server side 530 can also take the speech text result obtained from speech recognition processing and store the speech text result in correspondence with the ID, the speech, or a combination thereof. Thus, as soon as the receiving end 520 sends a speech recognition request, the text result corresponding to the speech ID in the request can be directly called up to increase the request response speed.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 6:
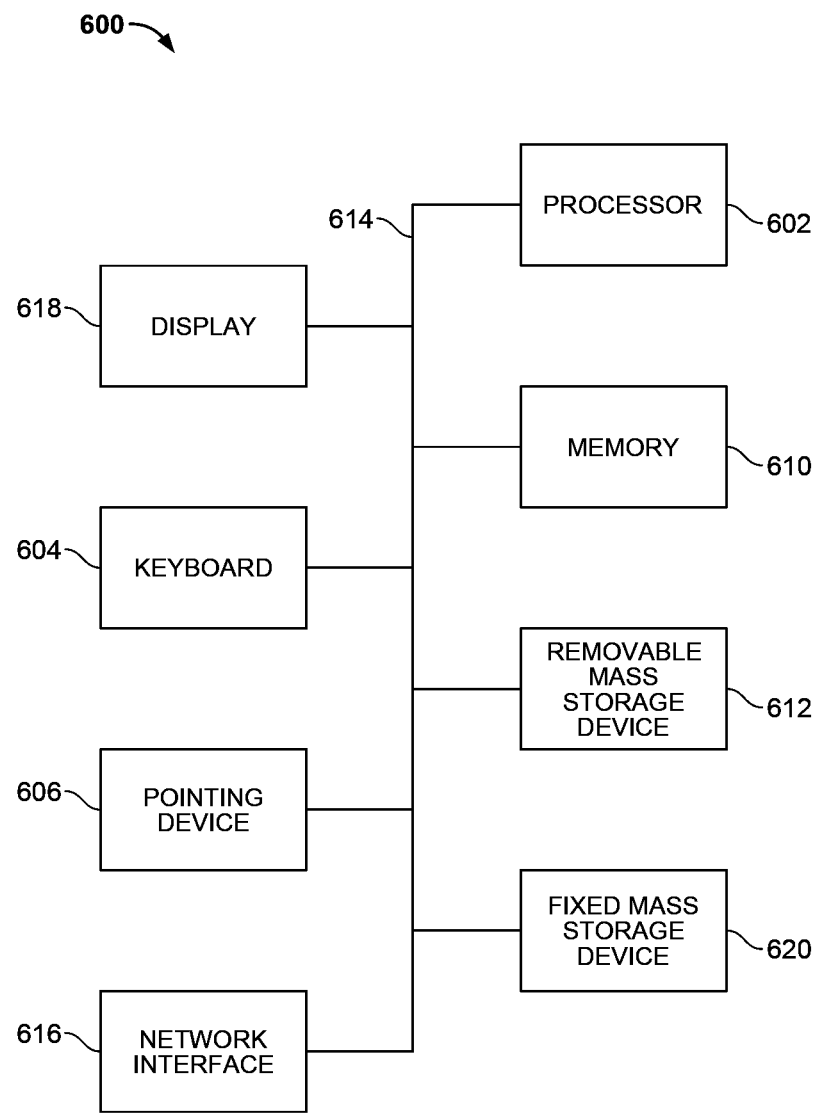
FIG. 6 is a functional diagram illustrating an embodiment of a programmed computer system for speech recognition processing.

FIG. 6 is a functional diagram illustrating an embodiment of a programmed computer system for speech recognition processing. As will be apparent, other computer system architectures and configurations can be used to perform speech recognition processing. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage 612, 620 generally store additional programming instructions, data, and the like that typically are not in active use by the processor 602. It will be appreciated that the information retained within mass storage 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A speech recognition system, comprising:
an instant messaging server (IMS) configured to:
assign a unique identifier to speech information received from a sending end to serve as a speech ID;
send the speech information to a receiving end; and
deliver the speech information to a speech recognition module, a speech recognition server, or a speech recognition server cluster;
the speech recognition module, the speech recognition server, or the speech recognition server cluster configured to:
perform speech recognition based on the speech information;
convert the speech information to obtain text information corresponding to the speech information; and
in the event that the IMS, the speech recognition server, or the speech recognition server cluster receives a speech recognition request issued from a user of the receiving end for the speech information, extract the speech ID corresponding to the speech information from the speech recognition request based on the speech ID to look up the text information corresponding to the speech ID, wherein the speech recognition module, the speech recognition server, the speech recognition server cluster, or any combination thereof is connected to the IMS; and
a sending module configured to send the obtained text information back as a speech recognition result to the receiving end.

2. The speech recognition system as described in claim 1, wherein the IMS is further configured to:
store the obtained text information in a cache in correspondence with the speech ID; and
in the event that another speech recognition request for the same speech information is received:
extract a speech ID from the other speech recognition request; and
locate the text information corresponding to the speech ID from the other speech recognition request.

3. The speech recognition system as described in claim 1, wherein the IMS is further configured to:
assign the speech ID to the speech information sent from the sending end;
store the speech ID corresponding to the speech information;
receive the speech recognition request from the receiving end; and
locate the speech information corresponding to the speech ID in the speech recognition request.

4. The speech recognition system as described in claim 1, wherein the IMS is further configured to:
assign the speech ID to the speech information sent by the sending end;
send the speech information to the receiving end;
perform speech recognition based on the speech information, the speech recognition converting the speech information to obtain the text information corresponding to the speech information;
store the text information corresponding to the speech ID, the speech information, or a combination thereof;

receive the speech recognition request from the sending end; and look up the text information corresponding to the speech ID based on the speech ID in the speech recognition request.

5. The speech recognition system as described in claim 1, wherein the IMS is further configured to:
in the event that the speech recognition request is received from the receiving end:
extract the speech ID from the request;
locate the corresponding speech information based on the speech ID;
submit the speech information and a speech recognition command to perform speech recognition on the speech information; and
obtain the text information corresponding to the speech information.

6. The speech recognition system as described in claim 1, wherein the IMS is further configured to:
in the event that the speech recognition request is received from the receiving end:
locate the corresponding text information based on the speech ID.

7. A speech recognition system, comprising:
an instant messaging server (IMS) configured to:
assign a unique identifier to speech information received from a sending end to serve as a speech ID;
send the speech information to a receiving end;
look up the speech information based on the speech ID; and
deliver the speech information to a speech recognition server or a speech recognition server cluster;
the speech recognition server or the speech recognition server cluster configured to:
receive a speech recognition request issued from a user of the receiving end corresponding to the speech information;
extract the speech ID corresponding to the speech information from the speech recognition request;
perform speech recognition based on the speech information and a speech recognition command in the speech recognition request;
convert the speech information to obtain text information corresponding to the speech information; and
send the speech ID to the IMS; and
a sending module configured to send the obtained text information back as a speech recognition result to the receiving end.

8. A method, comprising:
assigning, using an instant messaging server (IMS), a unique identifier to speech information received from a sending end to serve as a speech ID;
sending, using the IMS, the speech information to a receiving end;
delivering, using the IMS, the speech information to a speech recognition module, a speech recognition server, or a speech recognition server cluster, wherein the speech recognition module, the speech recognition server, or the speech recognition server cluster is configured to:
perform speech recognition based on the speech information;
convert the speech information to obtain text information corresponding to the speech information; and
in the event that the IMS, the speech recognition server, or the speech recognition server cluster receives a speech recognition request issued from a user of the receiving end for the speech information, extract the speech ID corresponding to the speech information from the speech recognition request based on the speech ID to look up the text information corresponding to the speech ID, wherein the speech recognition module, the speech recognition server, the speech recognition server cluster, or any combination thereof is connected to the IMS; and
sending the obtained text information back as a speech recognition result to the receiving end.

9. The method as described in claim 8, further comprising:
storing, using the IMS, the obtained text information in a cache in correspondence with the speech ID; and
in the event that another speech recognition request for the same speech information is received:
extracting, using the IMS, a speech ID from the other speech recognition request; and
locating, using the IMS, the text information corresponding to the speech ID from the other speech recognition request.

10. The method as described in claim 8, further comprising:
assigning, using the IMS, the speech ID to the speech information sent from the sending end;
storing, using the IMS, the speech ID corresponding to the speech information;
receiving, using the IMS, the speech recognition request from the receiving end; and
locating, using the IMS, the speech information corresponding to the speech ID in the speech recognition request.

11. The method as described in claim 8, further comprising:
assigning, using the IMS, the speech ID to the speech information sent by the sending end;
sending, using the IMS, the speech information to the receiving end;
performing, using the IMS, speech recognition based on the speech information, the speech recognition converting the speech information to obtain the text information corresponding to the speech information;
storing, using the IMS, the text information corresponding to the speech ID, the speech information, or a combination thereof;
receiving, using the IMS, the speech recognition request from the sending end; and
looking up, using the IMS, the text information corresponding to the speech ID based on the speech ID in the speech recognition request.

12. The method as described in claim 8, further comprising:
in the event that the speech recognition request is received from the receiving end:
extracting, using the IMS, the speech ID from the request;
locating, using the IMS, the corresponding speech information based on the speech ID;
submitting, using the IMS, the speech information and a speech recognition command to perform speech recognition on the speech information; and
obtaining, using the IMS, the text information corresponding to the speech information.

13. The method as described in claim 8, further comprising:
in the event that the speech recognition request is received from the receiving end:

locating, using the IMS, the corresponding text information based on the speech ID.

14. A method, comprising:

assigning, using an instant messaging server (IMS), a unique identifier to speech information received from a sending end to serve as a speech ID;

sending, using the IMS, the speech information to a receiving end;

looking up, using the IMS, the speech information based on the speech ID; and delivering, using the IMS, the speech information to a speech recognition server or a speech recognition server cluster, wherein the speech recognition server or the speech recognition server cluster is configured to:

receive a speech recognition request issued from a user of the receiving end corresponding to the speech information;

extract the speech ID corresponding to the speech information from the speech recognition request;

perform speech recognition based on the speech information and a speech recognition command in the speech recognition request;

convert the speech information to obtain text information corresponding to the speech information; and send the speech ID to the IMS; and sending the obtained text information back as a speech recognition result to the receiving end.

* * * * *